US009735955B2

(12) United States Patent
Verma et al.

(10) Patent No.: US 9,735,955 B2
(45) Date of Patent: Aug. 15, 2017

(54) OPTICAL CRYPTOGRAPHY SYSTEMS AND METHODS

(71) Applicant: The Board of Regents of the University of Oklahoma, Norman, OK (US)

(72) Inventors: Pramode Verma, Tulsa, OK (US); Bhagyashri Darunkar, Tulsa, OK (US); Nikhil Punekar, Tulsa, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 619 days.

(21) Appl. No.: 14/329,683

(22) Filed: Jul. 11, 2014

(65) Prior Publication Data

US 2017/0208040 A1    Jul. 20, 2017

Related U.S. Application Data

(60) Provisional application No. 61/845,757, filed on Jul. 12, 2013.

(51) Int. Cl.
| | |
|---|---|
| *H04L 29/06* | (2006.01) |
| *H04L 9/08* | (2006.01) |
| *H04K 1/00* | (2006.01) |
| *H04L 9/00* | (2006.01) |
| *H04L 9/30* | (2006.01) |

(52) U.S. Cl.
CPC .............. *H04L 9/08* (2013.01); *H04L 9/0883* (2013.01)

(58) Field of Classification Search
None
See application file for complete search history.

(56) References Cited

U.S. PATENT DOCUMENTS

| | | | | |
|---|---|---|---|---|
| 5,442,704 A | * | 8/1995 | Holtey | G06Q 20/341 235/380 |
| 5,953,424 A | * | 9/1999 | Vogelesang | H04L 9/0844 380/29 |
| 7,849,121 B2 | | 12/2010 | Fiorentino et al. | |
| 8,126,146 B2 | | 2/2012 | Kim et al. | |
| 2005/0063547 A1 | * | 3/2005 | Berzanskis | H04L 9/0852 380/278 |
| 2007/0140495 A1 | * | 6/2007 | Berzanskis | H04L 9/065 380/278 |

(Continued)

FOREIGN PATENT DOCUMENTS

WO    WO2007007996    1/2007

OTHER PUBLICATIONS

USPTO—Examiner-Initiated Interview Summary, Notice of Allowability, and Examiner's Amendment for U.S. Appl. No. 14/329,659, mail date Oct. 13, 2015.

(Continued)

*Primary Examiner* — Eric Chen
(74) *Attorney, Agent, or Firm* — Dunlap Codding, P.C.

(57) ABSTRACT

Systems and methods for sharing data between a first node and second node are disclosed. The methods may include sharing a first initialization vector between a first node and a second node using a multi-stage cryptography protocol. A first bit stream of first information may be passed from the first node to the second node using a single-stage cryptography protocol that encodes a message with the first initialization vector.

12 Claims, 7 Drawing Sheets

(56) References Cited

U.S. PATENT DOCUMENTS

| | | | | |
|---|---|---|---|---|
| 2009/0003591 A1* | 1/2009 | Murakami | ............ | H04L 9/0852 380/28 |
| 2009/0034715 A1* | 2/2009 | Ramasamy | ........... | H04L 9/0637 380/28 |
| 2009/0257583 A1* | 10/2009 | Schneider | ............. | H04L 9/0637 380/37 |
| 2010/0150344 A1* | 6/2010 | Karroumi | ............. | H04L 9/0637 380/45 |
| 2012/0087500 A1* | 4/2012 | Ukita | .................... | H04B 10/70 380/256 |

OTHER PUBLICATIONS

J. H. Thomas, "Variations on Kak's Three Stage Quantum Cryptography Protocol," *arXiv preprint arXiv:0706.2888*, 2007.

S. Kak, "A three-stage quantum cryptography protocol," *Foundations of Physics Letters*, vol. 19, pp. 293-296, 2006.

S. Mandal, G. Macdonald, M. E. Rifai, N. Punekar, F. Zamani, Y. Chen, S. Kak, P. K. Verma, R. C. Huck, and J. Sluss, "Implementation of Secure Quantum Protocol using Multiple Photons for Communication," *arXiv preprint arXiv:1208.6198*, 2012.

* cited by examiner

OPTICAL CRYPTOGRAPHY SYSTEMS AND METHODS

CROSS REFERENCE TO RELATED APPLICATIONS/INCORPORATION BY REFERENCE STATEMENT

The present patent application incorporates by reference the entire provisional patent application identified by U.S. Ser. No. 61/845,757, filed on Jul. 12, 2013, and claims priority thereto under 35 U.S.C. 119(e).

BACKGROUND

Quantum cryptography uses quantum mechanical effects to perform cryptographic tasks transmitting secure communications over networks. For example, using quantum key distribution (QKD), a secure communication may be transmitted between two parties (usually referred to as Alice and Bob) using a predefined and shared key such that a third party (usually referred to as Eve) is unable to identify the key.

There are generally two ways secure communications are currently transmitted using optical signals, through free space optics (FSO) or over a fiber optic network. Using polarization coding in FSO, a photon may be transmitted between two parties, with the photon at a specific state of polarization. Generally, if the parties know the state of polarization, the secure communication may be decoded.

In fiber optic networks, however, the state of polarization of a photon over an optical fiber may change during its passage through the fiber. In theory, optical fibers should preserve a state of polarization. In practice, however, a wave entering an optical fiber having a definite state of polarization may come out on the other end with a different random state of polarization due to micro-disturbances in the optical fiber. This means that a linearly polarized incident optical signal may become elliptically polarized when it exits the fiber. As such, the current art seeks to find alternative means to transmit secure communications without relying on the state of polarization across a fiber optic network.

Currently within the art, researchers are seeking to increase the transmission speed of the secure communication between the two parties using quantum cryptography to increase speed of communications. Additionally, researchers are looking for cryptography protocols that may be communicated over large distance, use fewer resources, but still have enhanced security for transmission between the parties without interference from an outside party due to man-in-the-middle attacks, photon siphoning attacks, plaintext-cipher text attacks, and the like.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing. The embodiments depicted in the drawings are not intended to be limiting in regard to the presently disclosed inventive concepts.

DETAILED DESCRIPTION

Figure 1:
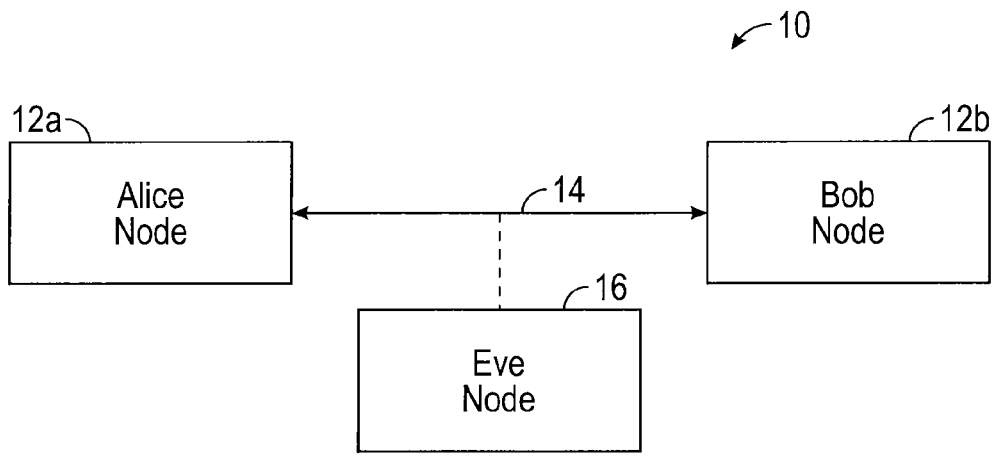
FIG. 1 is a schematic view of a communication system including a plurality of nodes communicating via one or more communication links in accordance with the present disclosure.

Before explaining at least one embodiment of the presently disclosed inventive concepts in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description.

Unless otherwise defined herein, scientific and technical terms used in connection with the presently disclosed inventive concepts shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed inventive concepts pertain. All patents, published patent applications, and non-patent publications referenced in any portion of this application are herein expressly incorporated by reference in their entirety to the same extent as if each individual patent or publication was specifically and individually indicated to be incorporated by reference.

All of the devices and methods disclosed herein can be made and executed without undue experimentation in light of the present disclosure. While the devices and methods of the presently disclosed inventive concept have been described in terms of particular embodiments, it will be apparent to those of skill in the art that variations may be applied to the devices and/or methods and in the steps or in the sequence of steps of the method described herein without departing from the concept, spirit and scope of the inventive concepts. All such similar substitutes and modifications apparent to those of skilled in the art are deemed to be within the spirit, scope and concept of the inventive concepts as defined herein.

The following detailed description refers to the accompanying drawings. The same reference numbers in different drawings may identify the same or similar elements.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. For example, unless otherwise noted, a process, method, article, or apparatus that comprises a list of elements is not necessarily limited to only those elements, but may also include other elements not expressly listed or inherent to such process, method, article, or apparatus.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

The term "about", where used herein when referring to a measurable value such as an amount, a temporal duration, and the like, is meant to encompass variations of ±20% or ±10%, or ±5%, or ±1%, or ±0.1% from the specified value, as such variations are appropriate to perform the disclosed methods and as understood by persons having ordinary skill in the art. Throughout this application, the term "about" is used to indicate that a value includes the inherent variation of error for measuring various parameters, such as the state of polarization of an optical signal, the method used to securely pass data between nodes, or the variation that exists when calibrating the nodes to securely pass data. Further, in this detailed description and the appended claims, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

In at least a first embodiment, the presently disclosed inventive concepts include a novel single-stage protocol, referred to herein as the braided single-stage protocol, implemented using multiple photons and can be used for transferring secure information over longer distances at higher speeds than existing quantum cryptography techniques and uses only a third of the transmission resources utilized by the three-stage protocol, a quantum cryptography protocol first proposed in 2006 and first implemented in 2012. Enhanced data transfer rate is achieved as the braided single-stage protocol transmits the data in only one stage. The braided single-stage protocol is immune to the man-in-the-middle attack, photon siphoning attack, and known plaintext-cipher text attack. The braided single-stage protocol is a major step forward over the existing quantum cryptography protocols in the following key areas: higher speed of communication over longer distances, considerably lower investment in transmission resources, and enhanced security. Applications of the braided single-stage protocol include providing security for optical networks including optical burst switched networks. The braided single-stage protocol can also be used, for example, for ship-to-ship or air-to-ground quantum communication.

In at least a second embodiment, the presently disclosed inventive concepts include a method for restoring or recovering the linear polarization state of a photon as it exits the far end of an optical fiber. The state of polarization of a photon over an optical fiber changes at random during its passage through the fiber. This means that a linearly polarized incident optical beam might become elliptically polarized when it exits the fiber. The present method is a deterministic protocol which will restore or permit recovery of the linear polarization state of a photon at the far end of the optical fiber. The disclosed method needs only a very low processing power to characterize the polarization behavior and can be implemented on any hardware platform. The disclosed method can be implemented over multimode and single mode optical fiber channels and is independent of the wavelength used for the operation. The disclosed method can be used to send secure data using polarization encoding over optical fibers. Furthermore, the disclosed method can also be used for intrusion detection on the optical fiber channel. Using a unique wavelength hopping technique, wavelengths can carry either the payload data or a unique secret key that can be used to encrypt payload data on all the other wavelengths in the fiber.

In at least a third embodiment, the presently disclosed inventive concepts include a security-enhanced three-stage cryptographic protocol which has a level of security comparable to a one time pad system. The one-time pad is the only means known to provide unconditionally secure communication. The disclosed novel protocol is based the concept of multi-stage cryptography which has been modified to include an initialization vector that is updated at each transmission.

Referring now to the Figures, and in particular to FIG. 1, shown therein and designated by reference numeral 10 is an exemplary communication system in accordance with the present disclosure. The communication system 10 may include a plurality of nodes 12 communicating via one or more communication links 14. Generally, the nodes 12 seek to transmit one or more secure communications over the communication link 14 in the presence of an adversary 16. The communication system 10 may communicate the secure communication via one or more optical signals over the communication link 14 in free space optics (FSO) or a fiber optic network as described in further detail herein.

The adversary 16 seeks to prevent secure communications over the communication link 14 via discovery of the secure communication, corruption of the communication, spoofing identity of one or more nodes 12, and/or the like. For example, in FIG. 1, node 12a (hereinafter referred to as Alice node 12a) and node 12b (hereinafter referred to as Bob node 12b) seek to provide one or more secure communications via optical signals over the communication link 14 in the presence of the adversary node 16 (hereinafter referred to as Eve node 16). It should be noted that the adversary node 16 may be similar in configuration as nodes 12a and 12b.

Figure 2:
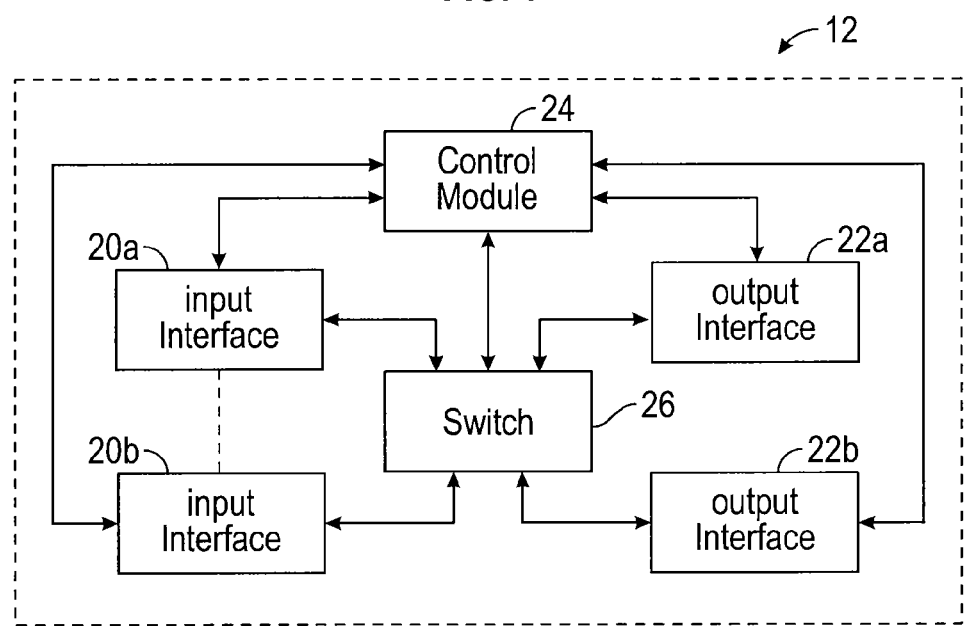
FIG. 2 is a schematic view of a node for use in the communication system illustrated in FIG. 1.

Each node 12 may be classified as a transmission system or a receiver system, and as such, each node 12 may be capable of transmitting and/or receiving signals (e.g., optical signal(s)). FIG. 2 illustrates an exemplary node 12 constructed in accordance with the present disclosure. Nodes 12 may be adapted to facilitate the communication of data within a network such as a mesh network, optical burst network, and/or the like, for example.

Each node 12 may be provided with one or more input interfaces 20, one or more output interfaces 22, and/or a control module 24. In some embodiments, the node 12 may optionally include a switch 26.

In general, the input interfaces 20 may be adapted to receive signals (e.g., optical signals) from a network. The switch 26 may serve to communicate the signals from the input interfaces 20 to the output interfaces 22 with the output interfaces 22 adapted to transmit the signals to the network. The control module 24 may control the operations of the input interfaces 20, the output interfaces 22, and the switch 26 as well as configure communication between nodes 12. For example, the control module 24, in some embodiments, may configure label switched paths within the network to facilitate communication between nodes 12.

Each node 12 may be implemented in a variety of manners. For example, in some embodiments, the node 12 may be a commercial installation having one or more backplanes, racks, and/or the like. In this example, the input interfaces 20, the output interfaces 22, the control module 24, and the switch 26 may be implemented as separate devices having separate power supplies, memory, and/or processing equipment. In some embodiments, the node 12 may be implemented as a single device having a shared power supply, memory, and/or processing equipment. In some embodiments, the node 12 may be implemented in a modular manner. For example, one or more of the input interfaces 20, the output interfaces 22, the control module 24, and/or the switch 26 may share a power supply and/or housing.

Referring to FIGS. 1 and 2, the input interfaces 20 and the output interfaces 22 of one node 12 may be adapted to communicate with corresponding input interfaces 20 and output interfaces 22 of another node 12 within a network. For example, the input interfaces 20 and output interfaces 22 of the Alice node 12a may be adapted to communicate with corresponding input interfaces 20 and output interfaces 22 of the Bob node 12b. In some embodiments, the input interfaces 20 and the output interfaces 22 may be optical ports.

The nodes 12 communicate via communication links 14. Communication links 14 may be any system capable of transmitting the signal between the nodes 12. The communication links 14 may be implemented in a variety of manners, such as optical fiber(s), waveguide(s) having optical signal carrying capabilities, and/or wireless links used in Free Space Optics (FSO). For example, in some embodiments, the communication link 14 may be a flexible, transparent fiber formed of silica or other similar material. Selection and implementation of the type of communication link 14 may be based on communication of the input interface 20 and output interface 22. For example, one or more input interfaces 20 may be designed to communicate wirelessly with another node 12, while one or more output interfaces 22 of the node 12 may be designed to communicate optically through a fiber-optic link.

In some embodiments, the communication link 14 may be an optical fiber in a fiber optic network. In at least one embodiment, the optical fiber may be formed of a birefringent material including a fast axis and a slow axis. The slow axis may have a high refractive index and the fast axis may have a lower refractive index as compared to the slow axis such that a component of an optical signal traveling on the fast axis will move faster than a component of the optical signal traveling on the slow axis.

For a particular node 12, input interfaces 20 may be the same or of a different type, output interfaces 22 may be the same or of a different type, and the input interfaces 20 and the output interfaces 22 may be the same or of a different type. The input interfaces 20 and the output interfaces 22 are shown separately for purposes of clarity; however, it should be understood that one or more input interfaces 20 and/or the output interfaces 22 may be connected and implemented as a single device. The input and output functions can be executed by a single physical interface The input interfaces 20, output interfaces 22, control module 24 and/or the switch 26 may include circuitry for implementing the various logic as described herein. The logic may be implemented as either software, hardware, or a combination of software and hardware. Circuitry may be analog and/or digital, components, or one or more suitably programmed microprocessors and/or associated hardware and software, or hardwired logic.

In some embodiments, the control module 24 may be a logical entity capable of processing signals between the input interfaces 20, output interfaces 22, switch 26 and/or external nodes 12. In some embodiments, the input interfaces 20, output interfaces 22 and/or switch 26 may be capable of processing signals directly without the use of the control module 24. For example, the input interface 20 and the output interface 22 may be able to process signals using protocols and/or transformations from in-band channels within a data stream and deliver the signals to the control module 24, other input interfaces 20, output interfaces 22, and/or the switch 26.

The control module 24 may include one or more processor(s) implemented in a variety of manners such as one or more single or multiple central processing unit(s), microprocessor(s), field programmable gate array(s) (FPGA), digital signal processor(s), application specific integrated circuits (ASIC), and/or the like.

The control module 24 may also include one or more non-transitory computer medium used for storing the logic discussed herein such that the logic may be executed by the processor(s). The non-transitory computer medium may be implemented as one or more memories, including, but not limited to, random access memory, read-only memory, or a combination of random-access memory and read-only memory. The one or more memories may be implemented in any suitable medium, including, but not limited to, solid state memory, optically-read/write memory, or magnetic read/write memory.

In some embodiments, signals may be transmitted on a control channel. The control channel may be a separate channel used to transmit the data stream. Such control signals may be processed by circuitry within the input interfaces 20, output interfaces 22, and/or control module 24. When the control signals are processed by the input interfaces 20 and/or output interfaces 22, the input interfaces 20 and/or the output interfaces 22 may notify the control module 26 of actions taken. In some embodiments, the input interfaces 20 and the output interfaces may have a unique logical identification. For example, the unique logical identification may be an IP address.

Figure 3:
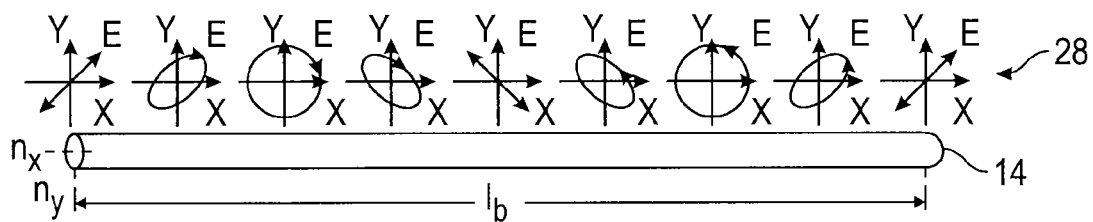
FIG. 3 is an illustration of polarization states of an optical signal as the optical signal passes through a birefringent optic fiber.

FIG. 3 illustrates a plurality of polarization states 28 of an optical signal during passage through the communication link 14 wherein the communication link 14 may be composed of a birefringent optical fiber. In fiber optic networks, the state of polarization of a photon over a birefringent optical fiber may change during passage through the fiber due to micro disturbances caused by vibration, changes in temperature or pressure.

As illustrated in FIG. 3, a polarization state of the optical signal may repeat after a particular length known as a beat length $l_b$. The beat length $l_b$ may change depending on factors including, but not limited to, birefringence property of the communication link 14, induced stress, applied pressure, vibrations, variation in the temperature, and the like. The state of polarization of the optical signal may repeat after the duration of the beat length $l_b$ and multiples thereof. By determining the fast axis angle for a known set of polarization states transmitted from one node 12 to another (e.g., the Alice node 12a to the Bob node 12b), a characterization angle for the communication link 14 may be determined. Once the characterization angle for the communication link 14 is determined for a defined set of polarization states, the characterization angle may be applied to unknown polarization states such that polarization coding may be used in transferring signals between the Alice node 12a and the Bob node 12b.

Figure 4:
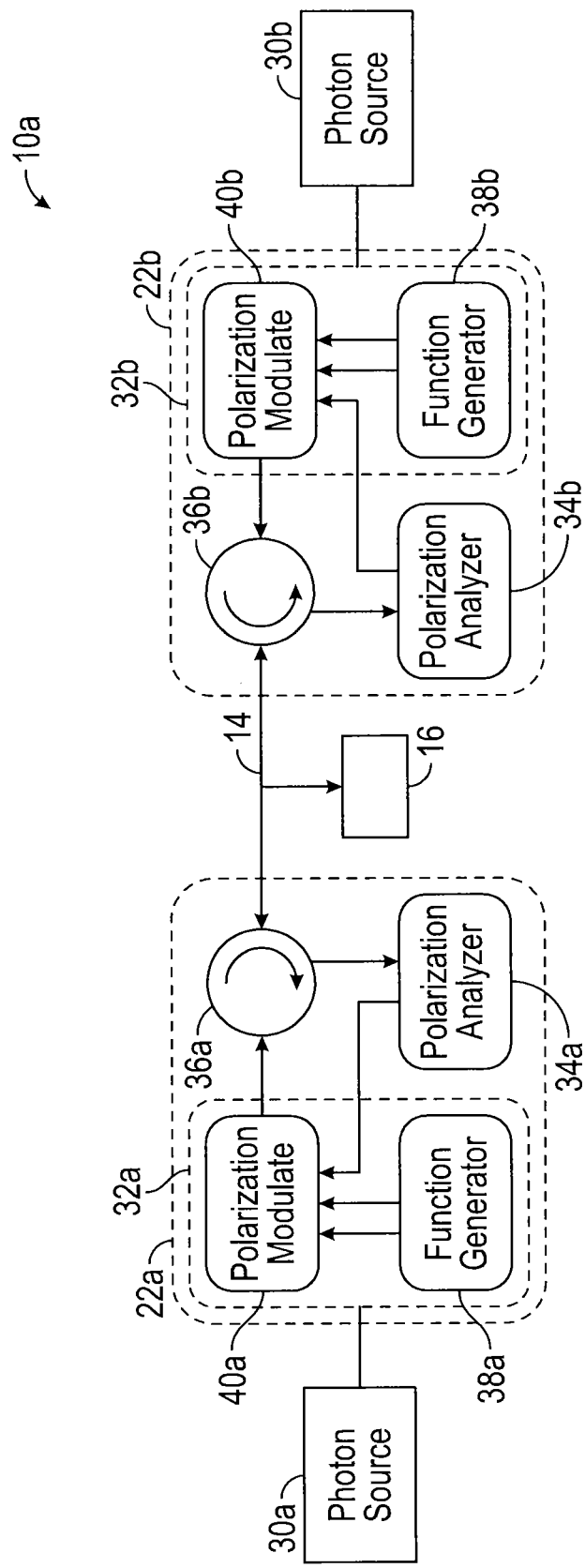
FIG. 4 is a schematic view of a first interface of a first node communicating via a communication link with a second interface of a second node in accordance with the present disclosure.

FIG. 4 illustrates an exemplary embodiment of the fiber optical communication system 10a wherein the system 10a is capable of determining and/or restoring an original polarization state of an optical signal at the Alice node 12a and the Bob node 12b using the characterization angle. By determining and/or restoring the original polarization state of the optical signal by determining the characterization angle, data may be encoded into the optical signal using different states of polarizations to represent bit states, such as a 15 degree angle to represent a "0" and an 85 degree angle to represent a "1". Further, knowing the original polarization state of the optical signal can be used to secure communications transmitted between the node 12a and the node 12b as described in further detail herein.

Each interface 20 and 22 of each node 12a and 12b may securely communicate over the communication link 14. For simplicity in description, FIG. 4 illustrates a schematic diagram of an output interface 22a of the Alice node 12a securely communicating over the communication link 14 to the input interface 20b of the Bob node 12b.

Each interface 20b and 22a may be in optical communication with a photon source 30 (e.g., laser source) and include a polarization controller 32, a polarization analyzer 34, and a combiner 36 which in this example is shown as a device known in the art as a circulator. Additionally, in some embodiments, each interface 20b and 22a may include or be in communication with one or more suitably programmed microprocessors and/or associated hardware and software, or hardwired logic. The processor(s) may be implemented in a variety of manners such as one or more single or multiple central processing unit(s), microprocessor(s), field programmable gate array(s) (FPGA), digital signal processor(s), application specific integrated circuits (ASIC), and/or the like.

Additionally, each interface 20b and 22a may include a non-transitory computer medium used for storing the logic performed by each interface 20b and 22a such that the logic may be executed by the processor(s). The non-transitory computer medium may be implemented as one or more memories, including, but not limited to, random access memory, read-only memory, or a combination of random-access memory and read-only memory. The one or more memories may be implemented in any suitable medium, including, but not limited to, solid state memory, optically-read/write memory, or magnetic read/write memory.

The photon source 30 may provide an optical signal to the polarization controller 32. For example, the photon source 30b in communication with the Alice interface 22a may provide an optical signal to the polarization controller 32a of the Alice interface 22a. Similarly, the photon source 30b in communication with the Bob interface 20b may provide an optical signal to the polarization controller 32b of the Bob interface 20b. In some embodiments, the photon sources 30a and 30b may be a laser or any other source capable of providing an optical signal. The photon sources 30a and/or 30b can use any operating wavelength and the configuration thereof (including the power) depends upon the distance to be travelled by the optical signal and the losses that will be incurred over the communication link 14.

For simplicity in description, the Alice interface 22a will be described herein. As one skilled in the art will appreciate, the Bob interface 20b will include similar systems and functionality. The polarization controller 32a may be capable of receiving the optical signal generated by the photon source 30a. Additionally, the polarization controller 32a may provide a change in the form of polarization of the optical signal and output the optical signal. In some embodiments, the polarization controller 32a may include a function generator 38a and a polarization modulator 40a. The function generator 38a may be capable of altering the form of polarization of the optical signal by supplying control signals to the polarization modulator 40a indicative of a series of particular angles (e.g., 15°, 85°, 15°, 85°, 15°, 15° etc. to represent a bit stream 010100) to be used by the polarization modulator 40a for setting the original states of polarization. In the examples set forth below, the control signals are implemented as different voltages that cause the polarization modulator 40a to change the polarization angles, i.e., +5V will induce a polarization change equal to 15 degrees. However, other mechanisms and types of control signals can be used to induce similar polarization changes. The polarization modulator 40a may receive the control signals and then modify the optical signal to generate the series of original states of polarization in a serial manner and transmit the optical signal to the communication link 14 via the combiner 36a.

The combiner 36a may receive the optical signal from the communication link 14 and direct the optical signal to the polarization analyzer 34a. The polarization analyzer 34a may receive the optical signal from the combiner 36a and measure the received state of polarization in the form of optical parameters. For example, the polarization analyzer 34a may measure and determine the received state of polarization state of a photon on an equator of the Poincaré sphere. In some embodiments, the received state of polarization may be determine using optical parameters such as Stokes' parameter, Jones' matrix, and/or the like, as described in further detail herein. The polarization analyzer 34a may supply the optical parameters to one or more processors to calculate and/or recover the original state(s) of polarization as discussed herein for decoding the optical signal. Further, the one or more processors may supply control signals to the function generator 38a to cause the polarization modulator 40a to create a subsequent or successive optical signal based on the original state(s) of polarization to, cause the interface to relay one or more portions of the optical signal along another communication link, or transmit, into the communication link 14, a derivation of the optical signal as described below with respect to the multi-stage cryptography protocol, or the braided single-stage protocol.

Referring to FIGS. 1 and 4, generally, the optical signal may be provided by the photon source 30a to the polarization controller 32a of the Alice node 12a. The polarization controller 32 of the Alice node 12a may receive the optical signal and provide a series of changes in the form of polarization of the optical signal. The polarization controller 32a of the Alice node 12a may then output the optical signal, having a first polarization state (i.e., the original polarization state) indicative of the required change in the form of polarization, to the communication link 14.

The Bob node 12b may receive the optical signal and provide the optical signal to the polarization analyzer 34b of the node 12b. The optical signal may have a second polarization state (i.e., received state of polarization) that is different from the original polarization state due to passing of the optical signal through the communication link 14, which may be an optical fiber constructed of a birefringent material. The polarization analyzer 34b of the Bob node 12b may measure the second (i.e., received state) of polarization of the optical signal and recover the first (i.e., original) polarization state.

Initial transmission of the optical signal from the Alice node 12a to the Bob node 12b may be provided with an expected pattern of polarization states (i.e., an initialization vector). For example, the polarization modulator 40a of the Alice node 12a may generate a pattern of polarization states in the optical signal such as:

$$\phi = 0°, 30°, 45°, 60°, 90°, 120°, 135°, \text{ and } 150° \quad \text{(EQ. 1)}$$

The pattern of polarization states set forth above is by way of example only. Other patterns of polarization states comprising alternate angles can be used. Additionally, more or fewer polarization states than indicated above can be used to carry out the characterization procedure. The Alice node 12a and the Bob node 12b may both know or share the expected pattern prior to transmission of the expected pattern from the Alice node 12a to the Bob node 12b. As the optical signal is transmitted over the communication link 14, the polarization state may be altered. For example, the communication link 14 may be a birefringent optical fiber altering the polarization state of the optical signal. In this example, the birefringent optical fiber may include a fast axis and a slow axis. The slow axis may have a high refractive index and the fast axis may have a lower refractive index as compared to the slow axis such that a component of the optical signal traveling on the fast axis will move faster than a component of the optical signal traveling on the slow axis.

The polarization analyzer 34b may receive the optical signal. The optical signal may be composed of the expected pattern of polarization states provided by the polarization modulator 40a of the Alice node 12a, although altered from their original transmission due to micro disturbances in the birefringent optical fiber. The polarization analyzer 34b of the Bob node 12b may determine projection of the received polarization state using, for example, the Stokes parameters and equation:

$$\varphi = \frac{1}{2} \tan^{-1}\left(\frac{S_2}{S_1}\right) \quad \text{(EQ. 2)}$$

The polarization analyzer 34b may then convert the angle φ into degrees and determine the angle of the fast axis of the optical fiber of the communication link 14. The angle of the fast axis of the optical fiber may be determined using the equation:

$$\sigma = \left(\varphi + \left(\frac{\phi - \varphi}{2}\right)\right) \bmod 90 \quad \text{(EQ. 3)}$$

An average of the fast axis angles may be determined and characterized by using the expected pattern polarization states transmitted by the Alice node 12a and comparable received polarization states by the Bob node 12b. The average of the fast axis angles may be characterized by:

$$\chi = \frac{\sum_{i=1}^{N} \sigma_i}{N} \quad \text{(EQ. 4)}$$

where N is the number of known polarization states transmitted by the Alice node 12a. In this example, N=8. The average of the fast axis angle may provide the characterization angle indicative of the axis of the birefringent material of the optical fiber of the communication link 14. The Bob node 12b may have suitable circuitry and/or processing capability to apply the characterization angle in determining unknown original states of polarization transmitted from the Alice node 12a to the Bob node 12b. Similarly, the same procedure can be repeated to characterize the channel for the Alice node 12a. It should be noted that the channel characterization angle for the Alice node 12a might be different even when the communication link 14 is a single mode optical fiber for communication, because the trajectory at the end of the communication link 14 adjacent to the Bob node 12b might be different than the trajectory at the end of the communication link 14 adjacent to the Alice node 12a. The following Tables 1 and 2 provide data showing results of an experiment conducted to characterize an optical fiber in accordance with the presently disclosed inventive concepts. Further details of this experiment are found in the provisional patent application identified by U.S. Ser. No. 61/845,757, which is incorporated herein by reference.

TABLE 1

Characterization of an optical fiber

| Angle of polarization transmitted by the Alice node 12a in degree | Voltage applied to the polarization modulator | Linear projection of angle of polarization computed by Bob in degree | Fast axis angle computation result in degree |
|---|---|---|---|
| Ø | $V_\pi$ = 30 V | $\varphi = \frac{1}{2}\tan^{-1}\left(\frac{S_2}{S_1}\right)$ | $\sigma = \left(\varphi + \left(\frac{\phi-\varphi}{2}\right)\right)\bmod 90$ |
| 1 | 0.167 | 142.62 | 71.81 |
| 30 | 5 | 112.94 | 71.47 |
| 45 | 7.5 | 97.68 | 71.34 |
| 60 | 10 | 82.59 | 71.29 |
| 90 | 15 | 53.57 | 71.78 |
| 120 | 20 | 22.86 | 71.43 |
| 135 | 22.5 | 7.78 | 71.39 |
| 150 | 25 | 172.64 | 71.32 |
| | | $\chi = \frac{\sum_{i=1}^{8}\sigma_i}{8}$ | 71.48 |

TABLE 2

Polarization states transmitted by the Alice node 12a, received and recovered by the Bob node 12b at the far end of an optical fiber

| Angle of polarization transmitted by the Alice node 12a in degree | Voltage applied to the polarization modulator | Linear projection of angle of polarization computed by Bob in degree | Original linear polarization angle calculated by the Bob node 12b in degree |
|---|---|---|---|
| Ø | $V_\pi$ = 30 V | $\varphi = \frac{1}{2}\tan^{-1}\left(\frac{S_2}{S_1}\right)$ | $(\chi + (\chi + \phi))\bmod 180$ |
| 81.1 | 13.517 | 62.24 | 80.72 |
| 100.5 | 16.75 | 42.99 | 99.97 |
| 88.9 | 14.812 | 54.72 | 88.24 |
| 158.6 | 26.433 | 165.19 | 157.27 |
| 144.6 | 24.1 | 178.79 | 144.17 |
| 57.2 | 9.533 | 85.98 | 56.98 |
| 143.8 | 23.967 | 179.39 | 143.57 |
| 126.6 | 21.1 | 16.83 | 126.13 |
| 90.8 | 0.167 | 53.1 | 89.86 |
| 59.8 | 15.133 | 83.42 | 59.54 |
| 29.6 | 9.967 | 114.23 | 28.73 |
| 40.5 | 4.933 | 102.97 | 39.99 |

As shown in Table 2, the original state of polarization calculated by the Bob node 12b is within approximately 1% and/or approximately 2° of the original state of polarization. There may be relatively small errors in computing the original polarization angle. This can be dealt with by keeping the used polarization angles sufficiently apart, e.g. more than about 2° such that consecutive polarization angles can be differentiated correctly with a very small error probability. The spacing between the used polarization angles can be based upon an estimate or measurement of the errors in computing the original polarization angle. This information can be used by the Bob node 12b to decode data that is encoded within the polarization states set by the Alice node 12a. To that end, the Alice node 12a may be able to transmit one or more secure communications in the presence of the Eve node 16 without discovery and/or corruption of the communications due to the fact that the Eve node 16 would not have the information indicative of the initialization vector prior to the initialization vector being transmitted from the Alice node 12a to the Bob node 12b.

Further, tapping into the communication link 14 by the Eve node 16 causes an abrupt change in the way the polarization of the optical signals drift between the Alice node 12a and the Bob node 12b. Thus, from the standpoint of the Bob node 12b, the characterization angle of 71.48° currently being used to determine and/or recover the original state of polarization will no longer be effective. In this instance, the Bob node 12b would generate an alert to signal other nodes 12, such as the Alice node 12a that the communication link 14 is subject to eavesdropping so that appropriate action can be taken. For example, upon receiving an alert from the Bob node 12b, the Alice node 12a may direct transmissions to the Bob node 12b by avoiding the communication link 14.

In some embodiments, the characterization angle of the communication link 14 may be recalibrated periodically using EQS. 1-4. Recalibration of the characterization angle may account for slow time-varying birefringence components of the communication link 14. Such slow time-varying birefringence components may include, but are not limited to, temperature, pressure, vibration, additional environmental factors, and/or the like.

In some embodiments, one or more calibration symbols may be embedded within the expected pattern of the changing states of polarization (e.g., the pattern provided by the polarization modulator 40a). The calibration symbols may be used to construct a calibration sequence for a subsequent iteration of calibration. The calibration symbols may be transmitted from the Alice node 12a to the Bob node 12b. The polarization analyzer 34b of the Bob node 12b may receive data indicative of the embedded calibration symbols, decode the data, and use the embedded calibration symbols to recalibrate the characterization angle. A logic sequence and/or an operator managing the Alice node 12a and the Bob node 12a may determine how to derive and/or use the calibration symbols for the next channel characterization iteration. The calibration symbols can be communicated separately, or be derived based on the data received or can be derived in other ways. Also, the number of calibration symbols required for characterization can vary and be any number. For example, in non-limiting embodiments, the number of calibration symbols can be between 1-1000.

In one example, the communication system 10 may use a concept known as polarization shift keying (POLSK) to convey information across the communication link 14. As discussed above, the communication link 14 can be free space, or an optical fiber. The communication system 10 uses a finite number of distinct signals to represent digital data. POLSK uses a finite number of distinct polarization states, each assigned a unique pattern of binary digits. In one embodiment, each distinct polarization state encodes an equal number of bits. Each pattern of bits forms a symbol that is represented by the particular polarization state. The Bob node 12b, which is pre-loaded with information indicative of a symbol-set, determines the polarization state of the received optical signal and maps the polarization state to the symbol it represents, thus recovering the original data. When the communication link 14 includes an optical fiber, the Bob node 12b will calculate the original state of polarization (as described herein) and then map the original state of polarization to the symbol it represents thus recovering the original data. Any number and particular pattern of bits of information can be assigned to a particular polarization state. Thus, a symbol may contain one or more than one bit of information. In one non-limiting embodiment, up to at least 8 bits of information can be represented by each polarization state.

In some embodiments, the communication link 14 may include two or more different wavelengths for communication over a fiber optic network. In one example, a distinct wavelength may be selected at random and used to communicate the encryption key with all other wavelengths capable of transmitting the secure communication for decoding. In this example, the communication link 14 may include two or more channels operating at different wavelengths of the optical signals. Each channel may be capable of transmitting secure communications between the Alice node 12a and the Bob node 12b using processes described herein. For example, the Alice node 12a may include multiple sets of the photon source 30a, and polarization controller 32a with each set operating at a different wavelength. The optical signals generated by the multiple sets can be fed into the combiner 36a for passage into the communication link 14. In this example, the communication link 14 may include a first fiber optic channel for carrying encryption keys encoded within a first optical signal of a first wavelength for the secure communication that is encoded within a second optical signal of a second wavelength being transmitted over a second fiber optic channel. Even further, in some embodiments, one or more secure communications being transmitted over the two or more channels may hop between available channels. For example, two optical channels may be on the same communication link 14 between the Alice node 12a and the Bob node 12b, but each channel may be using a different wavelength. Hopping between two or more channels may be randomized for any external entity. For example, the communication including encryption keys may randomly hop between available channels.

In addition, the communication system 10 can utilize dense-wavelength division multiplexing in which multiple wavelengths of optical signals are transmitted and received simultaneously with particular ranges of wavelengths forming different channels in the optical fiber. In this instance, the Alice node 12a would include multiple photon sources and polarization controllers 32a, whose outputs are combined and transmitted on the communication link 14. The Bob node 12b would include an optical filter for each range of wavelengths, with the output of each optical filter fed into a particular polarization analyzer 34b.

The process for sending secure communications using the pre-determined fast axis angle of the optical fiber may be performed for sending communication from the Bob node 12b to the Alice node 12a as well. It should be noted that the average fast axis angle of the optical fiber in the reverse direction (i.e., the Bob node 12b to the Alice node 12a), may be different even though the communication link 14 may be a single optical fiber. For example, the trajectory at the Bob node 12b may be different than the trajectory at the Alice node 12a, and as such, the average fast axis angles may be different.

In some embodiments, transmission of a secure communication may use a multi-stage cryptography process as described in further detail herein. Generally, a secure communication in an optical signal may be passed from the Alice node 12a to the Bob node 12b via the communication link 14 using a multi-stage cryptography algorithm that is distributed between the Alice node 12a and the Bob node 12b and used to provide secure communications between the Alice node 12a and the Bob node 12b. The multi-stage cryptography algorithm may include instructions for transmitting an odd-number of at least three optical signal transmissions across the communication link 14 using a plurality of independent transformations of polarization state of the optical signal transmission. However, it should be understood that the multi-stage algorithm discussed herein is not limited to an odd-number of at least three signal transmissions. Any number of signal transmissions N can be used so long as the multi-stage algorithm includes at least N+1 independent transformations of the polarization state of the optical signal transmission. Further, in the discussion that follows, it should be understood that in the multi-stage cryptography algorithm and/or the Braided single stage algorithm, the Alice node 12a and the Bob node 12b have already authorized each other using a predetermined methodology. In certain non-limiting examples, this authentication may only be performed once when the communication system is first commissioned. Thereafter, in this example, the multi-stage cryptography protocol and the braided single-stage cryptography protocol can function without further authentication. The authentication can be implemented in a variety of ways which are known to those skilled in the art.

Figure 5:
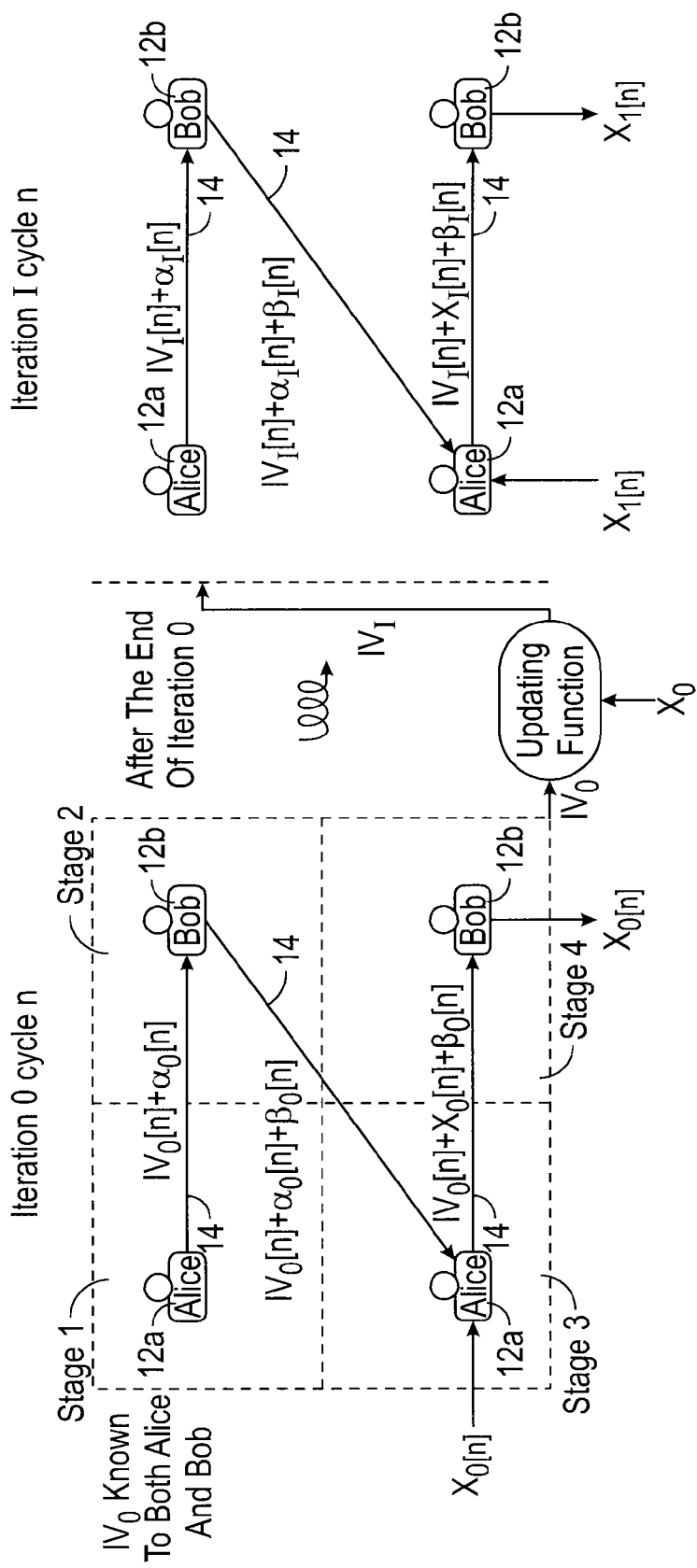
FIG. 5 is a schematic diagram of an exemplary embodiment of a multi-stage cryptography process for transmitting a secure communication via a communication link in accordance with the present disclosure.

Referring to FIGS. 1 and 5, illustrated therein is a schematic diagram of an exemplary embodiment of the multi-stage cryptography process 50. Generally, the multi-stage cryptography process 50 applies a transformation at Stage 1, Stage 2, and Stage 3 of the process. Initially, both the Alice node 12a and the Bob node 12b are both aware of an initialization vector $IV_0$ (i.e., secret key). Further, in some embodiments, the initialization vector $IV_0$ may contribute to the generation of a new vector $IV_1$ (i.e., new key) as described in further detail herein. The term "IV", as used herein denotes an initialization vector; the term "α" denotes a transformation associated with the Alice node 12a; the term "β" denotes a transformation associated with the Bob node 12b; and the term "X" denotes the message. In some embodiments, IV, α, β and X are all vectors (strings or arrays of values) having a same length z. The set $IV_0$, $α_0$, $β_0$ and $X_0$ refer to the set of arrays for iteration 0. The subscript refers to the number of the iteration. The terms "$IV_0[n]$," "$α_0[n]$," "$β_0[n]$" and "$X_0[n]$" denote the specific value at position n of the vector. "0" denotes the first cycle, and "1" denotes the second cycle. $IV_0$ may be generated randomly and known to both the Alice node 12a and the Bob node 12b before iteration 1. $IV_1$ is generated as described in the present disclosure. On the other hand α and β may be generated by the Alice node 12a and the Bob node 12b respectively and do not need to be shared between them. At each iteration a new set of α and β may be generated randomly.

In some embodiments, the initialization vector $IV_0$ having a length z may be shared with the Alice node 12a and the Bob node 12b prior to initial transmission of a signal. Generally, the initialization vector $IV_0$ is a string of z bits. The multi-stage cryptography process 50 may be performed for z cycles for each iteration to obtain z bits of a secret message X as described in further detail herein.

The Alice node 12a and the Bob node 12b may both be aware of a value for a polarization angle associated with each bit of the initialization vector $IV_0$. For example, the $n^{th}$ bit of $IV_0$ (referred to herein as "$IV_0[n]$") may be zero, and thus encoded with a 0° polarization angle. In another example, the $n^{th}$ bit of $IV_0$ ($IV_0[n]$) may be one, and thus encoded with a 90° polarization angle. It should be understood that bit 0 and bit 1 do not need to be encoded using orthogonal polarization angles. The values within the initialization vector $IV_0[n]$ may be any linear polarization angles.

Referring to FIG. 5, in Stage 1, the Alice node 12a may encode one or more qubits corresponding to a first bit of the initialization vector $IV_0$ with two or more specific polarization states. For example, the Alice node 12a may encode bit "0" with a first angle (e.g., 20 degrees), and bit "1" with a second angle (e.g., 80 degrees). The Alice node 12a may transform the polarization of the encoded qubits by applying a first transformation $α_0[n]$ of 30°, for example, that is reversible as discussed below. For example, the transformation $α_0[n]$ can be a unitary transformation. Thus, the first angle is transformed to 50° and the second angle is transformed to 110°. The Alice node 12a may then transmit the qubit to the Bob node 12b over the communication link 14.

In Stage 2, the Bob node 12b may receive the qubit, recover the original polarization states as discussed above when the communication link 14 is an optical fiber, and generate a second message by applying a second transformation $β_0[n]$ (referred to herein as the $n^{th}$ bit of $β_0$) to the received qubit that is reversible as discussed below. For example, the transformation $β_0[n]$ can be a unitary transformation. For example, the second transformation $β_0[n]$ may be 20°, and in this instance, the first angle is transformed to 70° and the second angle is transformed to 130°. The Bob node 12b may transmit the second message to the Alice node 12a over the communication link 14 with the second message including the initialization vector $IV_0[n]$, the first transformation $α_0[n]$, and the second transformation $β_0[n]$. Using the present notations, $IV_0[n]$, $α_0[n]$ and $β_0[n]$ are the values used at iteration number 0 ($1^{st}$ iteration) and cycle number n+1. Although a transformation for only one bit position for $α_0[n]$ and $β_0[n]$ are described in this example for purposes of brevity and clarity, such transformations may be applied to each of the bit positions.

Referring to FIG. 5, in Stage 3, the Alice node 12a may receive the second message, restoring the original polarization states as discussed above when the communication link 14 is an optical fiber, and may generate a third message by applying a transpose complex conjugate of $α_0[n]$ to the second message (e.g., to transform the first angle to 40° and the second angle to 100°) and encoding a secret message X in the form of the value of $X_0[n]$. The Alice node 12a may transmit the third message to the Bob node 12b over the communication link 14 with the third message including the initialization vector $IV_0[n]$, the secret message $X_0[n]$, and the second transformation $β_0[n]$.

In Stage 4, the Bob node 12b may decode the third message by restoring the original polarization states as discussed above when the communication link 14 is an optical fiber, applying a combination of a transpose complex conjugate of the initialization vector $IV_0[n]$ and a transpose complex conjugate of $β_0[n]$ to the third message as shown in FIG. 5. When the communication link 14 is an optical fiber having the birefringent material that causes changes to the original state of polarization, the Alice node 12a and/or the Bob node 12b may use the procedure described above to determine the original state of polarization to interpret and then decode the optical signals. In particular, decoding the third message allows for the Bob node 12b to decode the secret message $X_0[n]$.

The multi-stage cryptography process 50 illustrated in FIG. 5 may be repeated for multiple cycles. Generally, the number of cycles per iteration may be equal to the length of the string of the initialization vector $IV_0[n]$. For example, after completion of a cycle (e.g., n=1), at the next cycle, the Alice node 12a may use a new transformation set $α_0[n+1]$ and the Bob node 12b may use a new transformation set $β_0[n+1]$ with a next value in the string of the initialization vector $IV_0[n+1]$.

When the number of cycles is equal to the length z of the initialization vector $IV_0$, a new initialization vector $IV_1$ having a series of distinct polarization angles may be used as illustrated in FIG. 5. Generally, new initialization vector $IV_1$ may not need to commute with $α_1$ and/or $β_1$, which are new strings of bits for use as transformations for iteration 1. Further, the new initialization vector $IV_1$ may be in the binary form of 0's and 1's with the Alice node 12a and the Bob node 12b associating bits with pre-determined angles to form a string of variable transformation values. It should be noted that the transformation values associated with the binary form of 0's and 1's may be updated after each iteration with the Alice node 12a and the Bob node 12b using the identical methodology. In one embodiment, the initialization vector $IV_0$ and the initialization vector $IV_1$ have the same length.

In some embodiments, the new initialization vector $IV_0$ may be configured using messages shared between the Alice node 12a and the Bob node 12b. For example, in some embodiments, the initialization vector to $IV_1$ may be updated using an updating function that has both $X_0$ and $IV_0$ as inputs. In this example, $IV_1$ would be a combination of the bits from $X_0$ and $IV_0$. The particular combination can be a choice of both the Alice node 12a and the Bob node 12b. In other embodiments, the updating function may use one or more transmitted bits at predetermined location(s) within the secret message $X_0$, or any combination of transmitted bits of the secret message $X_0$ to compute the new initialization vector $IV_1$. In some embodiments, the original initialization vector $IV_0$ may be used by the algorithm to compute the new value $IV_1$. For example, the new initialization vector $IV_1$ may be computed by using a non-linear relation between $X_0$ and $IV_0$. For example, the non-linear relation can use an algorithm based on an Advanced Encryption Standard.

Figure 5A:
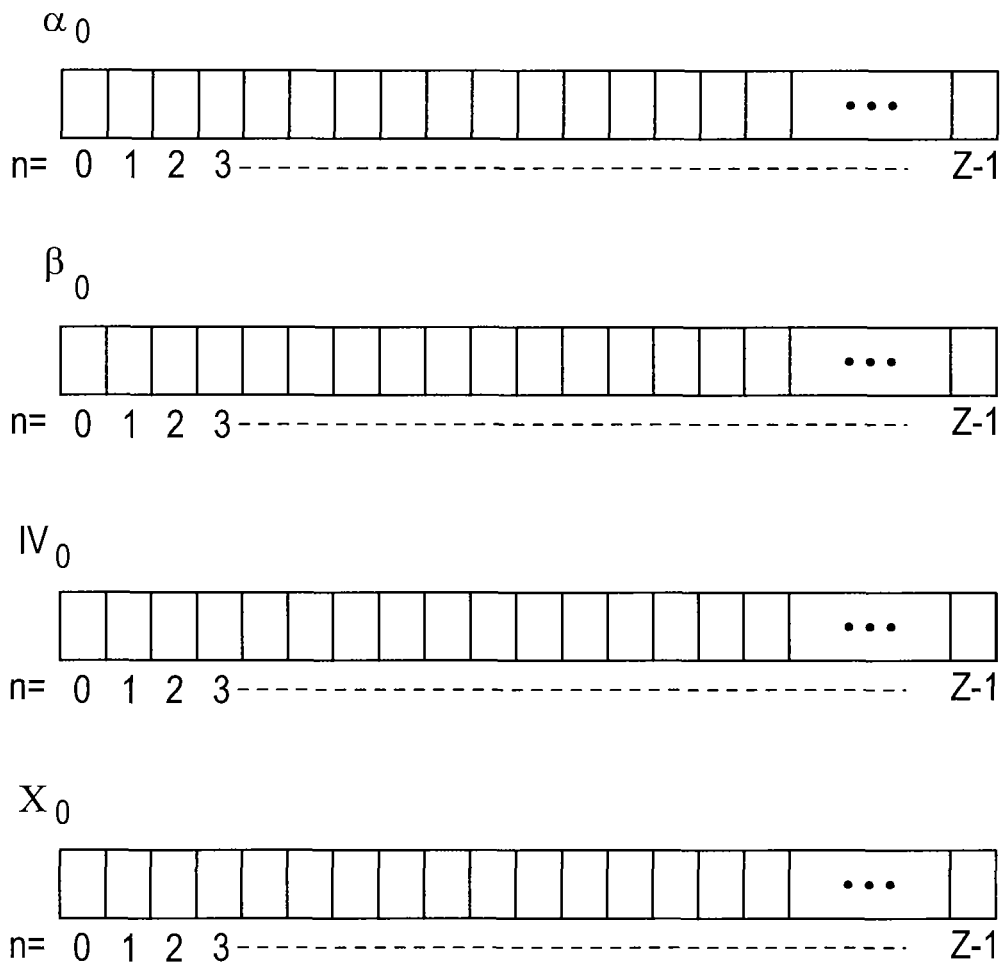
FIG. 5a is a schematic diagram of an exemplary array of transformations that may be used in the multi-stage cryptography processes of FIG. 5 and FIG. 6.

Shown in FIG. 5a is an exemplary, non-limiting, array of transformations and the secret message $X_0$ during a first iteration of the multi-stage cryptography protocol. As shown in FIG. 5a, all of the transformations may include bits 0 to z−1 and thereby include the same length. The values comprised in the string of values $X_0$, $\alpha_0$, $IV_0$, and $\beta_0$ for each bit are rotation angles associated with the fast axis of the half wave plates or other polarization modulator that is used to apply the rotation angles to the optical beam. This can be accomplished, for example, by using a half-wave plate set at a particular polarization angle to implement the transformation. A particular combination of bits of $IV_0$, $\alpha_0$ and $\beta_0$ may be used for encoding each bit of $X_0$. An iteration is the process of sharing all the z bits in the message thus communicating the string of values of $IV_0$, $\alpha_0$ and $\beta_0$. To communicate another message in a subsequent iteration, a new $IV_1$ is generated and such new $IV_1$ may be based on $IV_0$ and $X_0$ or parts of them using an updating function that may only be known by the Alice node 12a and the Bob node 12b. $IV_1$ is of the same length as $X_1$ and a totally new strings $\alpha_1$ and $\beta_1$ are generated by the Alice node 12a and the Bob node 12b respectively in order to share $X_1$.

Referring to FIGS. 4 and 5, in some embodiments, the communication system 10a illustrated in FIG. 4 may be used in the transmission of secure communication in the multi-stage cryptography process 50. For example, the photon source 30a may provide an optical signal to the polarization controller 32a of the Alice node 12a. The Alice node 12a may receive the optical signal, use the polarization controller 32a to encode the initialization vector $IV_0[n]$ and the first transformation $\alpha_0[n]$, and transmit the optical signal to the Bob node 12b. The communication link 14 may be an optical fiber, for example. As such the Alice node 12a and the Bob node 12b may receive the optical signal, and restore the original polarization state using the polarization analyzers 34a and 34b as provided in the processes described in relation to FIGS. 3 and 4 herein. The multi-stage cryptography process 50 proceeds as discussed above to securely transmit the secret message from the Alice node 12a to the Bob node 12b while calculating and restoring the original polarization states such that the Bob node 12b can decode the secret message.

In at least one embodiment, the secret message and the initialization vector transmitted from the Alice node 12a to the Bob node 12b are of the same length, such as 100 bits. If the secret message, before transmission, is shorter than the initialization vector (i.e., different lengths), then the length of the secret message can be adjusted to be the same length as the initialization vector. This can be accomplished, for example, by adding filler bits to the end of the secret message or shortening the length of the initialization vector. If the secret message is longer than the length of the initialization vector, then the secret message can be parsed into X number of segments which have the same length as the initialization vector used to transmit each of the segments. For example, if there are two segments, then the initialization vector $IV_0$ can be used for a first one of the segments, and the initialization vector $IV_1$ can be used for a second one of the segments. This methodology can then be repeated if the message X is parsed into more than two segments.

For example, if the secret message includes z bits and z=100, then all 100 bits can be transmitted in a single transmission by setting the initialization vector to z polarization angles. Or, the secret message can be transmitted in four separate transmissions of 25 bits setting the initialization vector to z/4 polarization angles, or the secret message can be transmitted in 100 transmissions by setting the initialization vector to a single polarization angle. When the secret message is segmented, the Bob node 12b will accumulate and concatenate the segments to re-create the secret message. After all z bits have been transmitted, the initialization vector may be updated for use in the transmission of the next secret message.

In some embodiments, the multi-stage cryptography process 50 of FIG. 5 may be implemented in an optical system using Free Space Optics (FSO). For example, the optical system may include a photon source, polarization controller, polarization modulator as described herein. The optical system using FSO may not restore the original polarization state using the polarization analyzer as polarization states do not drift or otherwise change in optical systems using FSO.

Figure 6:
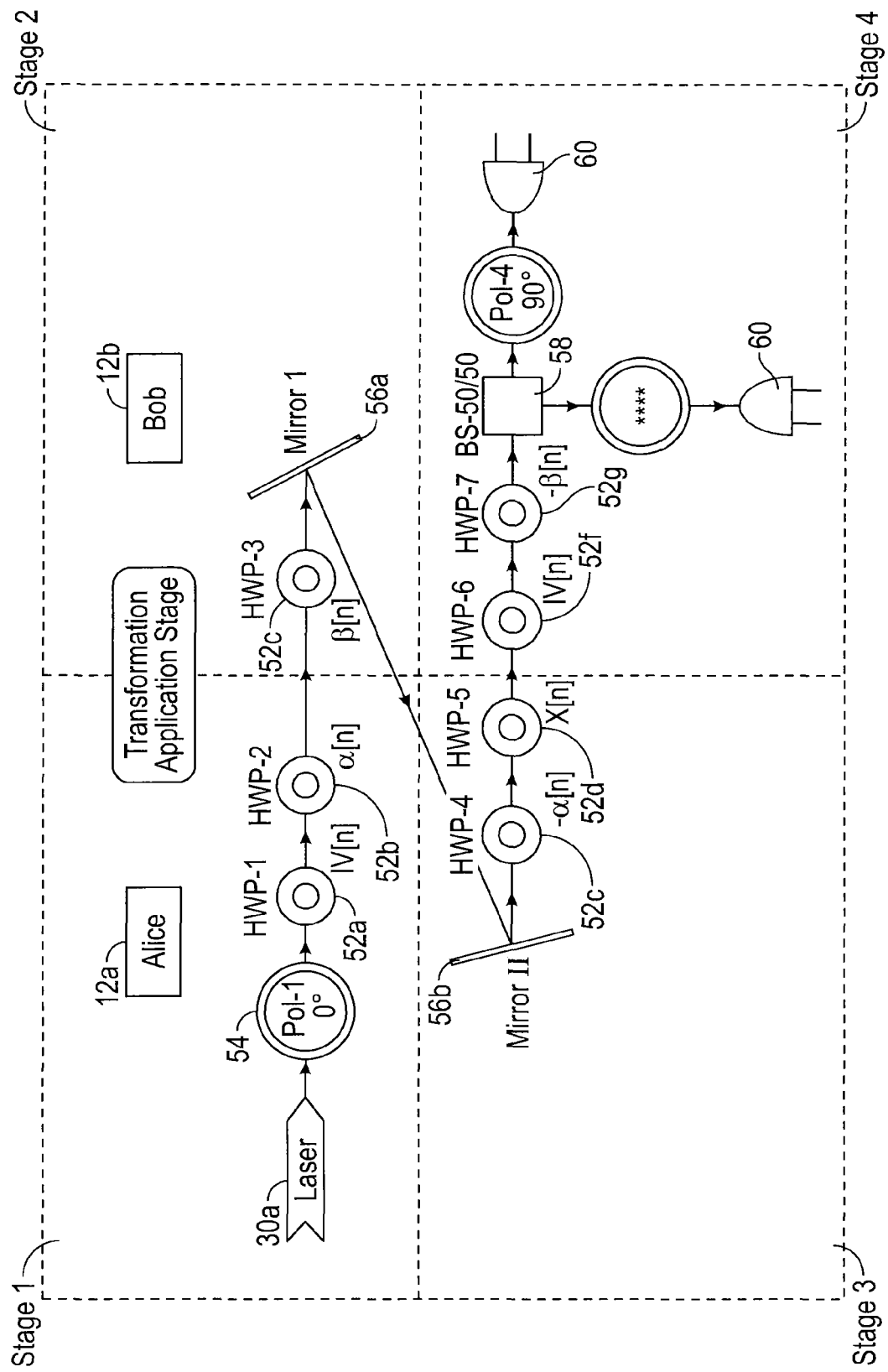
FIG. 6 is a schematic diagram of an exemplary embodiment of the multi-stage cryptography process illustrated in FIG. 5 implemented over free space optics (FSO) using passive optical components.

FIG. 6 illustrates a schematic diagram of an exemplary multi-stage cryptography process illustrated in FIG. 5 implemented over free space optics (FSO) using passive optical components. Although half-wave plates 52 are described and illustrated in FIG. 6, it should be apparent to one skilled in the art that a polarization controller 32 as described in relation to FIG. 3 herein may be used to generate the polarization states.

As illustrated in FIG. 6, the Alice node 12a may include a plurality of half wave plates 52. For example, in FIG. 6, the Alice node 12a may include four half wave plates 52a, 52b, 52c and 52d. The Bob node 12b may also include a plurality of half wave plates 52. For example, in FIG. 6, the Bob node 12b includes three half wave plates 52e, 52f and 52g.

In Stage 1, the Alice node 12a may generate an initial state with a polarizer 54. For example, the Alice node 12a may generate an initial state of 0° linear polarization using a 0° polarizer. The Alice node 12a may then apply a first transformation $IV_0[n]=\ominus$ using the half wave plate 52a set at an angle $\ominus$ and using the second half wave plate 52b set at an angle $\alpha_0[n]=\ominus_A$. The Alice node 12a may apply the transformations as the optical signal passes through the half wave plates 52a and 52b on the optical signal's path to the Bob node 12b.

In Stage 2, the Bob node 12b may apply a second transformation using the half wave plate 52e set at an angle $\beta_0[n]=\ominus_B$. The optical signal may then be transmitted to the Alice node 12 using mirror 56a.

In Stage 3, the Alice node 12a may receive the optical signal from the Bob node 12b via mirror 56b and remove the first transformation by setting the half wave plate 52c to an angle $\alpha_0[n]=-\ominus_A$. The Alice node 12a may then apply a transformation associated with an encoded bit using the half wave plate 52d set at an angle $\ominus_X=0°$ in case of bit=0, and $\ominus_X=45°$ in case of bit=1, for example. The Alice node 12a may transmit the optical signal containing the message to the Bob node 12b.

In Stage 4, the Bob node 12b may pass the optical signal containing the message through the half wave plate 52g set at an angle $IV_0[n]=\ominus$ to remove the transformation induced by the initialization vector. The choice of angles is made according to the operation of the half wave plates 52. The Bob node 12b may now have an optical signal polarized at either 0 degrees or 90 degrees. The optical signal may be passed through a beam splitter 58 (e.g., a 50/50 beam splitter) and through one or more light intensity detectors 60 to detect whether the bit 0 or the bit 1 has been received.

It should be noted that the values of $X_0[n]$, $\alpha_0[n]$, $\beta_0[n]$, and $IV_0[n]$ (and subsequent iterations of same) may be rotation angles associated with the fast axis of the half wave plates 52. In addition, the system depicted in the illustration of FIG. 6 may be implemented in a variety of ways. For example, in some embodiments, phase encoding may be used with current cryptography techniques. The discussion above denotes the operation of one cycle of iteration number 0, and such operations may be repeated with different values for other cycles and iterations.

Figure 7:
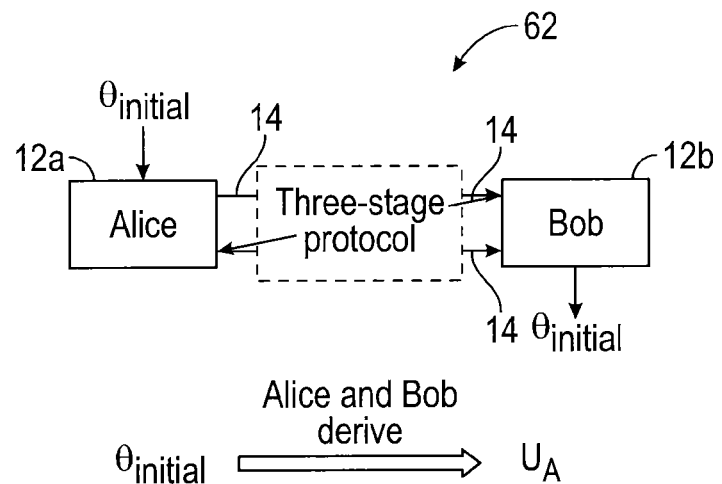
FIG. 7 is a schematic diagram of an exemplary single-state cryptography process for transmitting a secure communication via a communication link in accordance with the present disclosure.
Figure 7:
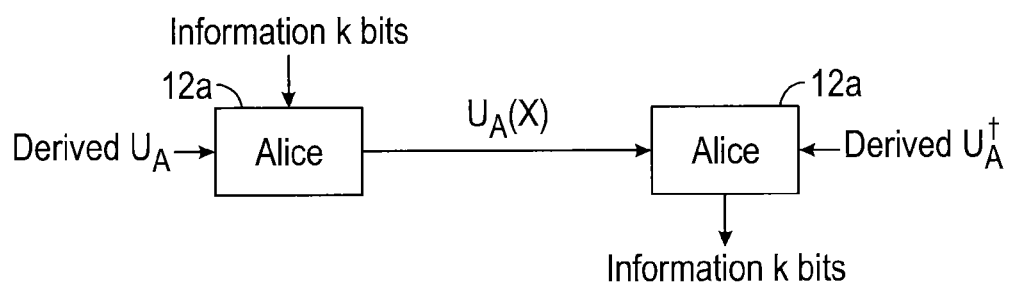

Referring to FIG. 7, in some embodiments, transmission of a secure communication may use a single-stage cryptography process 62. In the single-stage cryptography process 62, the Alice node 12a and the Bob node 12b may share a message indicative of an initial initialization vector $U_A$, using the multi-stage cryptography process discussed herein. The message is denoted as $\ominus_{initial}$ in FIG. 7. The message can either be the initial initialization vector $U_A$, or the initialization vector $U_A$ can be derived from the message. Generally, the initialization vector $U_A$ between the Alice node 12a and the Bob node 12b may include a string of unitary transformations. A first bit stream of information X may be encoded using the initialization vector $U_A$. The encoded first bit stream of information $U_A[X]$ may be passed from the Alice node 12a to the Bob node 12b. The Bob node 12b may read the values of predetermined locations of bits within the first bit stream and decode the message X due to the Bob node's 12b prior knowledge of $U'_A$. The predetermined locations of the bits within the first bit stream can be provided at any locations within the first bit stream so long as both the Alice node 12a and the Bob node 12b are supplied with information indicative of such predetermined locations. The string of transformations and the information indicative of the predetermined locations within the bit streams for generating the new transformation vector can be securely distributed using the multi-stage cryptography process 50 described above. A second vector may then be generated using the transformation vector $U'_A$. Using the second vector that was derived from information within the first bit stream, a second bit stream of information may be encoded and passed from the Bob node 12b to the Alice node 12a.

Figure 8:
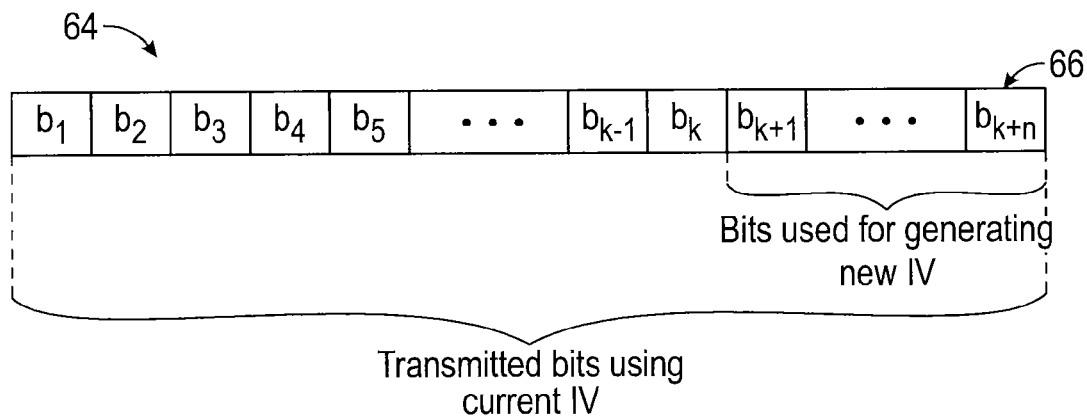
FIG. 8 is diagrammatic view of a framing scheme for use in the single-stage cryptography process illustrated in FIG. 7.

FIG. 8 illustrates an exemplary, non-limiting, framing scheme 64 for use in the single-stage cryptography process 62 of FIG. 7. In practice, other methodologies may be used to calculate the new angles of transformation for securely encoding and decoding subsequent frames of information. The Alice node 12a may transmit a predetermined number of bits b in a frame 66. For example, in FIG. 8, the Alice node 12a may transmit k+n of bits b in the frame 66. Both k and n are variables. The bits b in the frame 66 frame $b_1$ through $b_{k+1}$ may be transmitted using a first angle $\ominus$ of transformation. The Bob node 12b may be aware of the value of the first angle $\ominus$ of transformation. The bits b in the frame 66 from $b_{k+1}$ to $b_{k+n}$ may be used to generate a new angle of transformation for a subsequent frame.

Referring to FIGS. 7 and 8, the Alice node 12a and the Bob node 12b may determine an initial complex valued transformation. The initial value of the polarization angle $\ominus$ may be used to transmit the first $b_{k+n}$ bits of information from the Alice node 12a to the Bob node 12b. Starting from a pre-determined bit, (e.g., $b_{k+1}$) the Alice node 12a may generate a new angle $\ominus_1$. It should be noted that extraneous bits b of data are not being transmitted in order to generate new angle $\ominus_1$. Instead, using bits b of the last transmission may be used to generate new angle $\ominus_1$ by converting n bits b to an integer value N using, in one non-limiting embodiment, the formula:

$$N=\Sigma_{i=k+1}^{k+n} b_i * 2^i \qquad (\text{EQ. 5})$$

One skilled in the art will understand that other formulas may be used as well. The Alice node 12a and the Bob node 12b may determine the new angle $\ominus_1$ by using N and the previous angle $\ominus$, such that the value of the new angle $\ominus_1$ may be derived from transmitted bits and the current value of $\ominus$. The frame 66 may have a header portion and a data portion. The header portion of the frame may include information, including a destination address, intermediate addresses, quality of service identifiers and the like that is used to route the frame 66 through the network. The data portion of the frame 66 may include user data to being transmitted through the network, and in particular from the Alice node 12a to the Bob node 12b. The bits b used to determine the new angle $\ominus_1$ may be read from either the header portion or the data portion of the frame 66 and the new angle $\ominus_1$ may be calculated in a manner that is different from the routing process used to update the header portion at each intermediate node and the final destination. Further, in one embodiment, the bits b are read and used to calculate the new angle $\ominus_1$ by the Alice node 12a and the Bob node 12b without modifying the header portion or the data portion of the frame 66. In this instance, the Alice node 12a reads the bits b prior to transmitting the frame 66 and the Bob node 12b reads the bits b subsequent to receiving the frame 66, and prior to transmitting the frame 66 to a next destination node.

Figure 9:
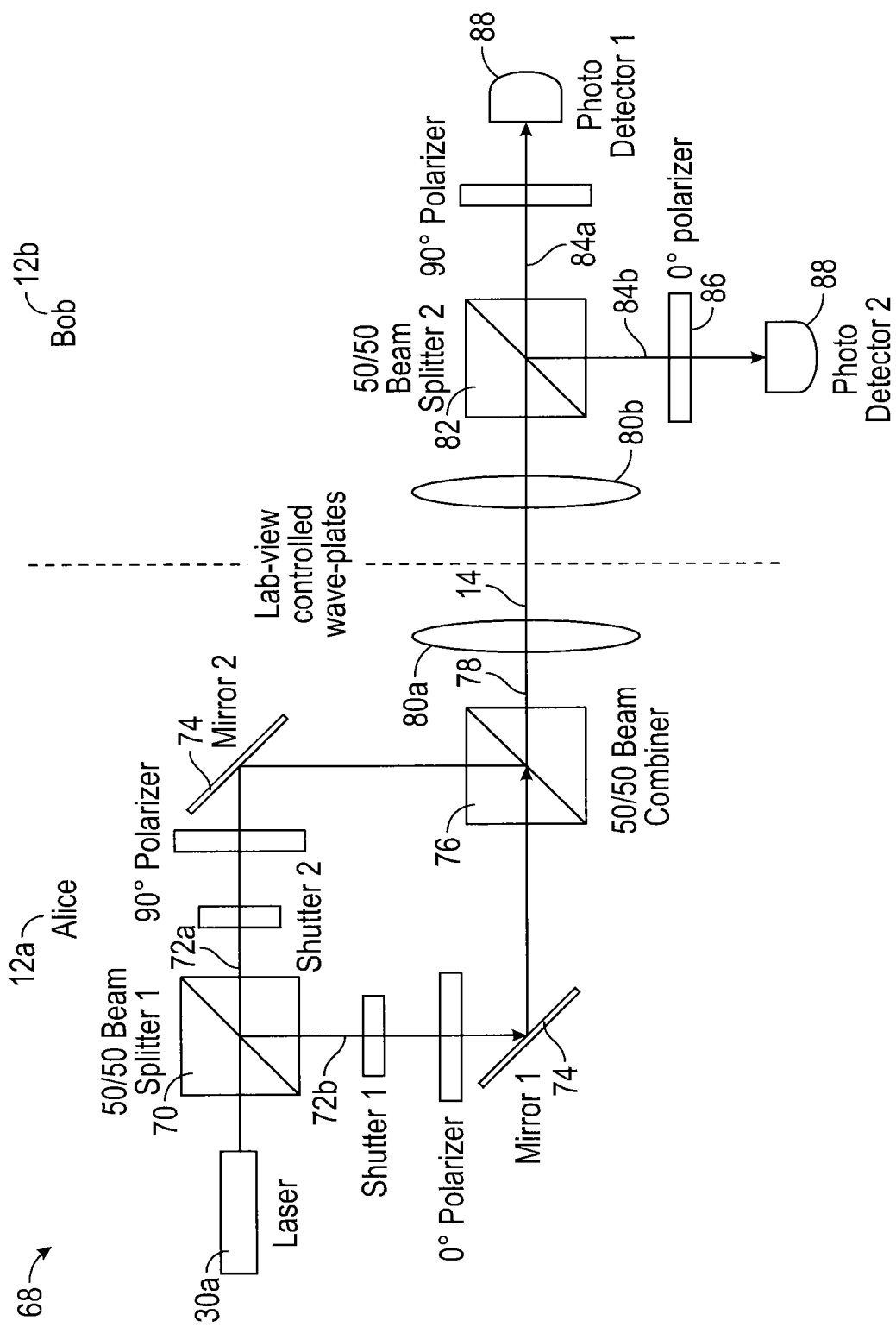
FIG. 9 is a schematic diagram of an exemplary embodiment of the single-stage cryptography process illustrated in FIG. 7 implemented using passive optical components.

FIG. 9 illustrates a schematic of a system 68 for implementing the single-stage process 60 of FIG. 8. Generally, bit 0 may be encoded as a pre-determined linear horizontal polarization and bit 1 may be encoded as a pre-determined linear vertical polarization. Half-wave plates are described for simplicity, however, it should be noted that alterations in polarization state may be performed using the polarization controller 32 as described in relation to FIG. 3.

The Alice node 12a may provide a sequence set for bits to be transmitted. The data may be converted in binary form using one or more processors and bits may be encoded in horizontal polarization for 0 and vertical polarization for 1.

An optical signal may be passed through a beam splitter 70 into two paths having substantially similar intensity. Using an assembly 72 of one or more mirrors 74 and beam combiners 76, the path of the optical signal may be directed towards one or more half wave plate 78. Each optical signal may be set to a particular state of polarization e.g., an initial pre-determined angle $\ominus$, by using the one or more half wave plates 78.

The optical signal may be directed to the Bob node 12b and passed through a half wave plate 80 to invert the transformation by the Alice node 12a. The optical signal may be passed through a beam splitter 82 and one or more polarizing filters 84. The light may then be detected to receive strings of 1s and 0s. The strings of 1s and 0s may be further converted to receive the original data or key. Further, a new angle $\ominus_1$ may be determined and used in further communications between the Alice node 12a and the Bob node 12b.

The single-stage cryptography process 62 described herein may use a multi-photon approach for implementation. The multi-photon approach may provide for quantum communications over large distances. As such, the single-stage cryptography process 62 may be suitable for ship-to-ship and air-to-ground communication via FSO. Additionally, the single-stage cryptography process 62 may use one two-way quantum channel only once to send information providing a three-fold increase in efficiency of use of the communication link 14 as compared to multi-stage processes. Even further, the single-stage cryptography process 62 may make use of complex valued transformations, such that the Eve node 16 may not be capable of retrieving information even with siphoning off of photons unless the Eve node 16 is aware of the value of the secret transformation.

In some embodiments, the multi-stage cryptography process 50 may be followed by the single-stage cryptography process 62 as described herein. For example, the multi-stage cryptography process 50 described in relation to FIGS. 4 and 5 may be used to convey an initialization vector $U_A$ for the single-stage cryptography process 62 from the Alice node 12a to the Bob node 12b such that the initialization vector $U_A$ is shared between each node prior to transmission of a secret message using the single-stage cryptography process 62.

As discussed above, in at least one embodiment, the Multi-stage cryptography protocol aims to distribute keys or share data in the form of one or more messages between a sender, e.g., Alice node 12a, and a receiver, e.g., Bob node 12b. As noted above, a key problem in multi-stage protocols of the prior art is that an advisory node, e.g., Eve, may have access to m equations with m variables which are easy to solve, wherein a security breach can occur.

To counter this vulnerability, in at least one embodiment of the presently disclosed inventive concepts, an initialization vector is added as an extra variable thus the adversary node, e.g., Eve, would have to solve a system of m equations with m+1 variables, which cannot be done.

A non-limiting example of the multi-stage cryptography protocol in which m=3 is discussed above. The presently disclosed inventive concepts include any number of m stages where m is greater than or equal to 2. For example, m can be even thus the communication would start at the receiver and end at the receiver. For example, If m=2 the Bob node 12b may send an angle of polarization (its transformation) to the Alice node 12a, which the Alice node 12a would encode the message and protect it with the initialization vector and then send the encoded message to the Bob node 12b. Because the Bob node 12b knows the angle of polarization that the Bob node 12b provided initially, as well as the initialization vector, the Bob node 12b would be able to decode and retrieve the message. In case m is odd the communication starts at the Alice node 12a and ends at the Bob node 12b.

In at least one embodiment described and referred to elsewhere herein as the Braided single-stage protocol, the concept of braiding takes into account having a multi-stage cryptography protocol (e.g., m=3) operating to share an initial key (referred to herein as an initialization vector) between a sender and a receiver. Then, the sender and the receiver may use a single-stage protocol in order to share messages between each other. The initialization vector may be updated after each iteration of the single-stage protocol in the same manner as the Enhanced Multi-stage with m=1.

At least one embodiment described and referred to elsewhere herein as the Enhanced Multi-stage protocol is a protocol that can be used to securely share keys, data or messages between two parties already sharing an initialization vector (e.g., the Alice node 12a and the Bob node 12b). In order to update the initialization vector after each iteration of the protocol, the initialization vector can be updated based on the previously shared message and the initialization vector of the previous iteration.

The Enhanced Multi-stage protocol with m=3 has been discussed by way of example on a bit by bit basis. In addition an array of bits can be communicated at each iteration. When an array of bits is communicated during the iteration, different transformations are applied to each bit by mapping the bits to be communicated with predetermined bits of the initialization vector.

As discussed herein, a fiber optic communication may include an optical fiber constructed of a birefringent material and a transmission system. The transmission system may include a laser source producing an optical signal, a polarization controller, and a receiver system. The polarization controller may receive the optical signal generated by the laser source, provide a change in state of polarization of the optical signal, and output the optical signal having an original polarization state indicative of the change in polarization to the optical fiber. The receiver system may have a polarization analyzer and a processor. The polarization analyzer may receive the optical signal from the optical fiber with the optical signal having a received state of polarization that is different from the original polarization state due to passing of the optical signal through the birefringent material of the optical fiber. The polarization analyzer may measure the received state of polarization. The processor may receive information from the polarization analyzer indicative of the received state of polarization and recover the original polarization state.

In one non-limiting example, the received state of polarization may be measured by optical parameters. For example, the received state of polarization may be measured by optical parameters including at least one of Stokes' parameters and Jones' Matrix.

In one non-limiting example, the polarization encoding techniques may be used to encode a message within the optical signal. Additionally, a symbol may contain at least one bit of information.

In some embodiments, the polarization analyzer may measure Stokes' parameters indicative of the received state of polarization, and supply the Stokes' parameters to the processor. The processor may recover the original polarization state by adjusting the received state of polarization as indicated by the Stokes' parameters with at least one characterization angle being indicative of an axis of the birefringent material of the optical fiber. In one non-limiting example, the optical signal may have a faster moving component of polarized light, and the axis of the birefringent material may align with the faster moving component of the polarization light.

In some embodiments, an optical communication method may include receiving, by a second node, one or more photons at a second linear state of polarization. The one or more photons may be initially injected by a first node into and pass through a birefringent material of an optical fiber at an original linear state of polarization in a fiber optic communication system as described herein. The original linear state of polarization may be recovered using data indicative of a predetermined effective angle of an axis of the birefringent material of the optical fiber.

In some embodiments, an optical communication method may include may include receiving, by a second node, one or more photons at a second linear state of polarization. The one or more photons may be initially injected by the first node into and pass through a birefringent material of an optical fiber at an original linear state of polarization in a fiber optic communication system. The original linear state of polarization may be restored using data indicative of a predetermined angle of an axis of the birefringent material of the optical fiber.

In some embodiments, an optical communication method may include injecting, by a first node, a polarized beam of light into an optical fiber. The polarized beam of light may have at least two different polarization states indicative of information encoded into the polarized beam of light. A second node may receive and analyze the polarized beam of light to determine a series of states of polarization of the polarized beam of light. The second node may be remote from the first node, in one non-limiting example. The encoded information may be decoded into the polarized beam of light using the series of states of polarization. In one non-limiting example, the polarized beam of light may be analyzed at specific instants of time.

In some embodiments, an optical fiber calibration method for a polarization encoding technique may include transmitting, by a transmission system, an optical signal having an expected pattern of polarization states through a birefringent material of an optical fiber. The expected pattern of polarization states is an initialization vector having a set of polarization angles characterized by optical parameters. The initialization vector may be shared between the transmission system and a receiving system. The optical signal may be received by the receiving system. The optical signal may be composed of the expected pattern of polarization states. The received polarization states may be measured in a form of received optical parameters. The received optical parameters may be compared with the optical parameters of the set of polarization angles of the initialization vector to calculate a characterization angle indicative of an axis of the birefringent material of the optical fiber.

In one non-limiting example, the optical signal may include a first optical signal and a second optical signal. The second optical signal may be transmitted after the first optical signal. The second optical signal may have an original polarization state indicative of a change in a form of polarization. A received state of polarization may be measured by a polarization analyzer of the receiving system and the original polarization state may be recovered. The polarization analyzer may further recover the original polarization state by adjusting the received state of polarization with a characterization angle indicative of an axis of the birefringent material of the optical fiber. The optical signal may also have a faster moving component of polarized light, and the axis of the birefringent material may align with the faster moving component of the polarized light, in one non-limiting example. In some embodiments, the characterization angle may be periodically recalibrated to account for changes in a birefringence component of the optical fiber. In some embodiments, transmitting the optical signal may further include embedding multiple calibration symbols in the expected pattern of polarization states to construct calibration sequences for successive iterations of calibration. The polarization analyzer may receive the data indicative of the embedded calibration symbols and use the embedded calibration symbols to recalibrate the characterization angle.

In some embodiments, a polarization-based intrusion detection and monitoring method may include receiving, by a first node, an expected pattern of polarization states from a second node via an optical fiber. The expected pattern of polarization states may include an initialization vector that includes a set of polarization angles to be generated during a calibration procedure. A characterization angle may be calculated for the optical fiber. Further, a polarize beam of light may be received from a second node. Data about the received polarization states may be extracted in a form of optical parameters. The optical parameters may be compared to the characterization angle and an alert may be generated based on deviations from the characterization angle.

In some embodiments, a fiber optic system may include an optical fiber and a transmission system. The transmission system may include a laser source producing an optical signal of any wavelength, a polarization modulator, and a receiver system. The polarization modulator may receive the optical signal generated by the laser source and encode information into the optical signal by providing changes in polarization state to generate a polarized beam of light. The polarization modulator may transmit the polarized beam of light to the optical fiber. The receiver system may include a polarization analyzer and a processor. The polarization analyzer may receive the polarized beam of light from the optical fiber and measure the optical parameters indicative of a set of polarization states of the polarized beam of light. The processor may receive the optical parameters and decode the information from the optical parameters.

In one non-limiting example, the optical fiber may include a first channel and a second channel. The polarized beam of light may hop from the first channel to the second channel in the transmission system. In some embodiments, the first channel and the second channel may be parallel optical fibers. In some embodiments, a first polarized beam of light may include an encryption key and a second polarized beam of light may include secure data for transmission. The transmission system and the receiver system may be synchronized to communicate the first and second polarized beams of light using a pattern of wavelengths. The hopping of the polarized beam of light from the first channel to the second channel may be randomized, for example.

In one non-limiting example, the fiber optic system may include a plurality of optical fibers (e.g., optical fibers constructed of birefringent material). In this example, a plurality of wavelengths may be used to transmit the polarized beam of light through the plurality of optical fibers. In one non-limiting example, a first wavelength of the plurality of wavelengths may be selected to transmit an encryption key and at least a second wavelength of the plurality of wavelengths may be selected to communicate secure data.

In some embodiments, a method may include sharing a first initialization vector $IV_0$ between a first node and a second node using a multi-stage cryptography protocol. The first initialization vector $IV_0$ may include a string of transformations. A first bit stream of first information may be passed from the first node to the second node using a single-stage cryptography protocol. The first bit stream may be encoded by the first initialization vector $IV_0$. Values of predetermined locations of bits within the first bit stream may be read and a transformation vector indicative of the values may be stored. A second initialization vector $IV_1$ may be generated using a predetermined algorithm and the transformation vector. A second bit stream of second information may be passed from the first node to the second node using a single-stage cryptography protocol. The second stream may be encoded with the second initialization vector $IV_1$.

In one non-limiting example, the string of transformations may represent a string of polarization angles. In this example, passing the first bit stream from the first node to the second node may include polarization encoding of the first bit stream with a polarization modulator and the string of transformations.

In some embodiments, the first bit stream of the first information may be passed from the first node to the second node over an optical fiber. The optical fiber may be constructed of a birefringent material, in one non-limiting example. In some embodiments, the polarized beam of light may have at least two different polarization states indicative of information encoded into the polarized beam of light. For example, in some embodiments, the at least two different polarization states may include a horizontal polarization state and a vertical polarization state. In one non-limiting example, the polarized beam of light may be received from the optical fiber and optical parameters indicative of a set of polarization states of the polarized beam of light may be measured.

In some embodiments, the first bit stream may include a frame. The frame may have a first set of bits and a second set of bits. In one non-limiting example, the first set of bits may be passed from the first node to the second node using a first angle of transformation shared between the first node and the second node. The second set of bits may be passed from the first node to the second node using a second angle of transformation generated by the first node.

In some embodiments, the first bit stream and the initialization vector are the same length. In some embodiments, data encoded into the first bit stream and the initialization vector are of a different length. In one non-limiting example, the first bit stream may include at least one filler bit such that the first bit stream and the initialization vector are of the same length. In another non-limiting example, the first bit stream includes at least two segments; each segment may have a similar length as the initialization vector.

In some embodiments, a method may include transmitting a first message by a first node. The first message may be generated by applying a first transformation $\alpha_0$ to an initialization vector $IV_0$. The initialization vector $IV_0$ may include a string of transformations. A second message may be received by the first node. The second message may be generated by applying a second transformation $\beta_0$ to the first message. A third message may be transmitted by the first node. The third message may be generated by applying a transpose complex conjugate of the first transformation $\alpha_0$ to the second message and encoding a secret message in a form of $X_0$.

In some embodiments, the first transformation and the second transformation may refer to a set of array transformations of the same length. Each value of the arrays may be used on one bit of the message $X_0$ to be shared.

In some embodiments, a second initialization vector $IV_1$ may be generated using a fourth message. Additionally, a fifth message may be transmitted by the first node. The fifth message may be generated by applying a fourth transformation $\alpha_1$ to the second initialization vector $IV_1$. The first initialization vector $IV_0$ and the second initialization vector $IV_1$ may be of the same length, in one non-limiting example.

In some embodiments, the string of values of the first initialization vector $IV_0$ and the first transformation $\alpha_0$ are of the same length. In some embodiments, the first set of transformations $\alpha_0$ and the first set of values of the initialization vector $IV_0$ are of a different length. In one non-limiting example, the first set of transformations $\alpha_0$ may include at least one filler bit. In another non-limiting example, the first set of transformations $\alpha_0$ may include at least two segments with each segment having the same length as the first initialization vector $IV_0$.

In some embodiments, a method for communicating between a first node and second node may include the second node receiving a first message from the first node. The first message may be generated by applying a first transformation $\alpha_0$ to an initialization vector $IV_0$. The initialization vector $IV_0$ may include a string of transformations. A second message may be transmitted by the second node to the first node. The second message may be generated by applying a second transformation $\beta_0$ to the first message. A third message may be received by the second node. The third message may be generated by applying a transpose complex conjugate of $\alpha_0$ to the second message and encoding a secret message in a form of $X_0$. The third message may be decoded by applying a combination of a transpose complex conjugate of $IV_0$ and a transpose complex conjugate of $\beta_0$ to the third message, thereby forming decoded third message. In some embodiments, a second initialization vector $IV_1$ may be generated using the decoded third message. In one non-limiting example, the initialization vector $IV_0$ and the second initialization vector $IV_1$ may be the same length.

In some embodiments, a method for encoding a message may include passing the message from a first node to a second node via a communication link using a multi-stage cryptography algorithm distributed between the first node and the second node. Applied circuitry within the first node and the second node may include instructions for transmitting at least two optical signal transmissions across the communication path and using a number of independent transformations of polarization state of the optical signal transmission by a combination of the first node and the second node at least equal to the number of optical signal transmission across the communication link. In one non-limiting example, the initialization vector may be shared between the first node and the second node. The initialization vector may be a series of data representative of linear polarization angles.

In some embodiments, a transmission system may include a laser source, a polarization modulator and a processor. The laser source may produce an optical signal. The polarization modulator may receive the optical signal generated by the laser source. The processor may be configured to obtain an initialization vector $IV_0$ via a multi-stage cryptography protocol, and to provide control signals to the polarization modulator to cause the polarization modulator to modulate polarization states into the optical signal thereby encoding a message using the initialization vector $IV_0$ and a single-stage cryptography protocol. In certain non-limiting examples, the initialization vector $IV_0$ includes a string of transformations representing a string of polarization angles. The transmission system may also include a port sized and configured to receive and support an optical fiber connector of an optical fiber, the port receiving the optical signal generated by the laser source and modulated by the polarization modulator. In another example, the transmission system may include a lens positioned inside a housing having an opening, the lens receiving the optical signal generated by the laser source and modulated by the polarization modulator and directing the optical signal through the opening and away from the housing. In certain non-limiting examples, the transmission system may include a polarization analyzer configured to receive an optical signal, and measure optical parameters indicative of a set of polarization states of the optical signal; and wherein the processor may be configured to receive the optical parameters and derive an initialization vector $IV_1$ based on the initialization vector $IV_0$ and certain of the optical parameters.

It will be understood from the foregoing description that various modifications and changes may be made in the various embodiments of the presently disclosed inventive concepts without departing from their true spirit. For example, polarization states can be set in a variety of manners using half-wave plates, polarization modulators and combinations thereof. The description provided herein is intended for purposes of illustration only and is not intended to be construed in a limiting sense. Thus, while the presently disclosed inventive concepts have been described herein in connection with certain embodiments so that aspects thereof may be more fully understood and appreciated, it is not intended that the presently disclosed inventive concepts be limited to these particular embodiments. On the contrary, it is intended that all alternatives, modifications and equivalents are included within the scope of the presently disclosed inventive concepts as defined herein. Thus the examples described above, which include particular embodiments, will serve to illustrate the practice of the presently disclosed inventive concepts, it being understood that the particulars shown are by way of example and for purposes of illustrative discussion of particular embodiments of the presently disclosed inventive concepts only and are presented in the cause of providing what is believed to be a useful and readily understood description of procedures as well as of the principles and conceptual aspects of the inventive concepts.

Changes may be made in the formulation of the various components and compositions described herein, the methods described herein or in the steps or the sequence of steps of the methods described herein without departing from the spirit and scope of the presently disclosed inventive concepts.

What is claimed is:

1. A method, comprising:
    sharing a first initialization vector $IV_0$ between a first node and a second node using a multi-stage cryptography protocol, the first initialization vector $IV_0$ including a string of transformations representing a string of polarization angles;
    passing a first bit stream of first information from the first node to the second node as light transmitted over an optical fiber using a single-stage cryptography protocol, the first bit stream being polarization encoded by using a polarization modulator to apply a first polarization angle to a first set of bits within the first bit stream and a second polarization angle to a second set of bits within the first bit stream in accordance with the first initialization vector $IV_0$, wherein the first polarization angle and the second polarization angle are different;
    reading a subset of predetermined locations of bits within the first bit stream and generating a transformation vector based on the subset;
    generating a second initialization vector $IV_1$ using a predetermined algorithm and the transformation vector; and
    passing a second bit stream of second information from the second node to the first node using a single-stage cryptography protocol, the second bit stream being polarization encoded by applying a third polarization angle to a first set of bits within the second bit stream and a fourth polarization angle to a second set of bits within the second bit stream in accordance with the second initialization vector $IV_1$, wherein the third polarization angle and the fourth polarization angle are different.

2. The method of claim 1, wherein the optical fiber is constructed of a birefringent material.

3. The method of claim 1, further comprising the step of encoding information into an optical signal by injecting, by the first node, a polarized beam of light into the optical fiber, the polarized beam of light having at least two different polarization states indicative of information encoded into the polarized beam of light.

4. The method of claim 3, where the at least two different polarization states include a horizontal polarization state and a vertical polarization state.

5. The method of claim 3, further comprising the step of receiving the polarized beam of light from the optical fiber, and measuring optical parameters indicative of a set of polarization states of the polarized beam of light.

6. The method of claim 1, wherein the first bit stream includes a frame having the first set of bits and the second set of bits.

7. The method of claim 1, wherein the first bit stream and the first initialization vector $IV_0$ are of the same length.

8. The method of claim 1, wherein data encoded into the first bit stream and the first initialization vector $IV_0$ are of a different length and the first bit stream includes at least one filler bit such that the first bit stream and the first initialization vector $IV_0$ are of the same length.

9. The method of claim 1, wherein the first bit stream and the first initialization vector $IV_0$ are of a different length, and the first bit stream includes at least two segments, each segment having a similar length as the first initialization vector $IV_0$.

10. A transmission system, comprising:
    a first laser source producing a first optical signal;
    a first polarization modulator receiving the first optical signal generated by the first laser source;
    a first hardware processor configured to obtain an initialization vector $IV_0$ representing a string of polarization transformations via a multi-stage cryptography protocol, and to provide control signals to the first polarization modulator to cause the first polarization modulator to apply, into the optical signal, a first polarization angle to a first set of bits within a first bit stream and a second polarization angle to a second set of bits within the first bit stream thereby encoding a first message using the initialization vector $IV_0$ and a single-stage cryptography protocol, wherein the first polarization angle and the second polarization angle are different;
    a polarization analyzer configured to receive the first optical signal, and measure optical parameters indicative of a set of polarization states of the first optical signal;
    a second laser source producing a second optical signal;
    a second polarization modulator receiving the second optical signal; and
    a second hardware processor configured to read a subset of predetermined locations of bits within the first optical signal, generating a transformation vector based on the subset, and generate a second initialization vector $IV_1$ using a predetermined algorithm and the transformation vector, and enable the second polarization modulator to apply, into the second optical signal, a third polarization angle to a first set of bits within a second bit stream and a fourth polarization angle to a second set of bits within the second bit stream thereby encoding a second message using the initialization vector $IV_1$ and the single-stage cryptography protocol, wherein the third polarization angle and the fourth polarization angle are different.

11. The transmission system of claim 10, further comprising a port sized and configured to receive and support an optical fiber connector of an optical fiber, the port receiving the first optical signal generated by the first laser source and modulated by the first polarization modulator.

12. The transmission system of claim 10, further comprising a lens positioned inside a housing having an opening, the lens receiving the first optical signal generated by the first laser source and modulated by the first polarization modulator and directing the first optical signal through the opening and away from the housing.

* * * * *